Patented Nov. 3, 1925.

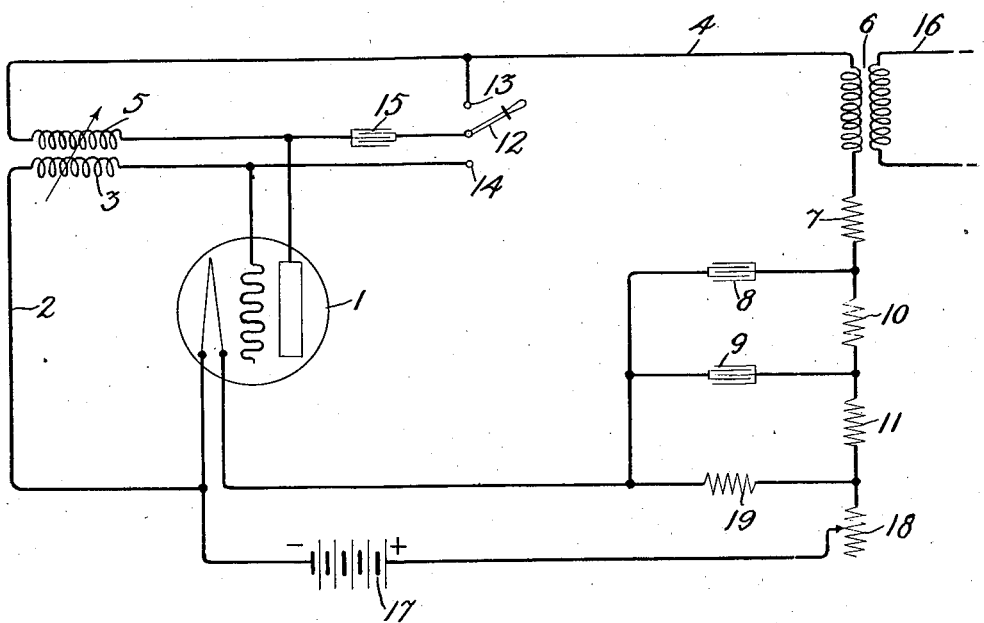

1,559,776

UNITED STATES PATENT OFFICE.

HARRY S. READ, OF NEW HAVEN, CONNECTICUT, ASSIGNOR TO WESTERN ELECTRIC COMPANY, INCORPORATED, OF NEW YORK, N. Y., A CORPORATION OF NEW YORK.

THERMIONIC REPEATER OR OSCILLATOR CIRCUITS.

Application filed December 9, 1919. Serial No. 343,538.

*To all whom it may concern:*

Be it known that I, HARRY S. READ, a citizen of the United States, residing at New Haven, in the county of New Haven and State of Connecticut, have invented certain new and useful Improvements in Thermionic Repeater or Oscillator Circuits, of which the following is a full, clear, concise, and exact description.

This invention relates to thermionic repeaters, and more especially to thermionic repeaters combined with appropriate circuits for the generation of oscillations.

The invention includes means for automatically causing the space current of a thermionic device, as for example, an oscillation generator or amplifier, to assume a proper or desired value when the cathode energizing current has assumed a desired value of vice versa.

The invention also includes means whereby, by a single adjustment, as by variation of a resistance, the space and plate currents of a thermionic device may be simultaneously and conveniently regulated.

Among the objects of the invention is to provide means whereby the thermionic repeater circuit may be kept in a condition of constant efficiency. In the case of an oscillator a generated wave of constant and uniform frequency and output may thus be obtained even though there are used therewith varying or different sources of voltage.

A thermionic repeater having appropriate circuits associated therewith, whereby it may function as an oscillation generator and having applied thereto the features comprising the invention, is shown in the accompanying drawing. The vacuum tube 1 includes a heated filamentary cathode, an anode and an impedance varying element in the form of a grid. Connected between the grid and the cathode is the input circuit 2 including the inductance coil 3. The output circuit 4 includes the inductance coil 5, a primary of a transformer 6, a resistance 7, and a filter net work comprising capacities 8 and 9 and resistances 10 and 11. The switch 12 is adapted to make contact with either of two terminals 13 or 14. In the position 13, the switch includes a capacity 15 in shunt to the coil 5 in the output circuit. In this position the frequency of the oscillations generated is determined primarily by the capacity 15 and the inductance coil 5. When the switch 12 is in the position 14, the frequency of the oscillations generated is determined primarily by the circuit including capacity 15, coil 5 and the coil 3, together with the effective mutual inductance between the coils 3 and 5. Transformer 6 and the filter network will have a slight effect upon the frequency. The secondary of the coil 6 is in circuit with any suitable output line 16 to which may be connected any suitable load device. A single source 17 which may be in the form of a battery, a direct current generator or other suitable energy supplying means is connected in circuit with the resistances 18 and 19 in such a manner as to supply heating current to the filamentary cathode and simultaneously supply a proper space current through the tube. The resistances 18 and 19 are so proportioned that when the variable resistance 18 is properly adjusted to establish the filament-heating current at a proper value, the space current will likewise assume a proper value. This results from the fact that a given value of filament-heating current in passing through the resistance 19 invariably causes the same voltage drop across the terminals of resistance 19. Since the difference in potential of the terminals of resistance 19 determines the space current through the tube, this space current will always assume the same value whenever the filament-heating current assumes a given value irrespective of the voltage supplied by the source 17 which may vary over a wide range or may at different times comprise sources of widely different voltage. In case the source 17 comprises a mechanical generator or other source having an alternating component which would cause an undesirable irregularity in the output current or a disturbance in the line 16, a filter is provided. This filter comprises capacities 8 and 9 so related to resistances 7, 10 and 11 that the alternating component of the current supplied is shunted through the capacities 8 and 9 instead of being impressed upon the tube. Preferably the resistance coils 1 and 11 are wound so that they will be highly inductive.

In a given generator designed to produce current over a range of 30,000 to 120,000 cycles per second the source 17 could vary over a range of from 100 to 120 volts with a resulting change of less than 2% in the frequency produced at any adjustment of resistance 18 to give the proper filament heating current. The resistance 18 was variable between zero and a suitable maximum value and the resistance 19 had a value of 70 ohms.

While a complete system embodying the invention is described herein, the features of invention are not limited to any particular embodiment and may be embodied in other constructions. The novel features believed to be inherent in the invention are defined in the appended claims.

What is claimed is:

1. A thermionic repeater having a space current circuit, a cathode heating circuit, and appropriate auxiliary circuits for the generation of oscillations, in combination with energizing means for said space current and cathode heating circuits, and a single variable element for simultaneously establishing and maintaining the energization of one of said two first-mentioned circuits at a given value when the energization of the other thereof is established at a given value, independently of the voltage of said means.

2. A thermionic repeater comprising a space discharge device having an electrically heated cathode requiring a heating current of a value between certain definite closely adjacent limits to produce constancy of operation within certain definite limits, a source of heating current for said cathode, regulating means to establish the heating current within the stated limits when variation of said source tends to cause a departure therefrom, and regulating means operatively controlled by the operation of said first mentioned regulating means to establish the anode-cathode potential of said device within definite limits irrespective of the nature or extent of the adjustment required to establish the heating current within the stated limits.

3. A thermionic repeater having a space current circuit, a cathode heating circuit, and energizing means for said circuits, in combination with a rheostat common to said circuit for fixing and maintaining the current in one of said circuits at a definite and desired value as the result of establishing the current in the other of said circuits at a definite and desired value by means of the operation of said rheostat.

4. In a system in accordance with claim 3 in which the rheostat serves to compensate for slow variations in voltage supply, a filter circuit shunted across the space current supply circuit for preventing rapid variations in voltage of the current supply source from being impressed upon the space current path of the repeater.

In witness whereof, I hereunto subscribe my name this second day of December, A. D. 1919.

HARRY S. READ.